United States Patent [19]
Eckardt et al.

[11] Patent Number: 5,759,459
[45] Date of Patent: Jun. 2, 1998

[54] METHOD FOR PRODUCING PLASTIC OBJECTS

[75] Inventors: Helmut Eckardt, Meinerzhagen; Jürgen Ehritt, Hilchenbach; Alfons Seuthe; Michael Gosdin, both of Meinerzhagen, all of Germany

[73] Assignee: Battenfeld GmbH, Meinerzhagen, Germany

[21] Appl. No.: 681,932

[22] Filed: Jul. 29, 1996

[30] Foreign Application Priority Data

Aug. 30, 1995 [DE] Germany ............ 195 31 709.2

[51] Int. Cl.⁶ .......... B29C 45/17; B29C 45/73; B29C 45/77
[52] U.S. Cl. .......... 264/40.1; 264/572; 425/130
[58] Field of Search ............ 264/572, 40.1; 425/130

[56] References Cited

U.S. PATENT DOCUMENTS 5,607,640  3/1997  Hendry ............ 264/572

FOREIGN PATENT DOCUMENTS

| 0 321 117 | 6/1989 | European Pat. Off. . |
| 0 438 279 A1 | 7/1991 | European Pat. Off. . |
| 0 678 370 A1 | 4/1995 | European Pat. Off. . |
| 3919333 A1 | 12/1990 | Germany . |
| 39 13 109 C2 | 6/1991 | Germany . |
| 43 33 543 A1 | 4/1995 | Germany . |
| 5-96560 | 4/1993 | Japan . |
| 5154862 | 6/1993 | Japan . |
| 6064024 | 3/1994 | Japan . |
| 6238697 | 8/1994 | Japan . |
| 6-297522 | 10/1994 | Japan . |
| 7-148798 | 6/1995 | Japan . |
| 7-323436 | 12/1995 | Japan . |
| 96/34731 | 11/1996 | WIPO . |

OTHER PUBLICATIONS

Eyerer, P., "Spritzgeiss en mit Gasinnendruck,"*Kunststoffe 83*, pp. 505-517 (1993). (English Language Abstract).

*Primary Examiner*—Catherine Timm
*Attorney, Agent, or Firm*—Hamilton, Brook, Smith & Reynolds, P.C.

[57] ABSTRACT

A method and an apparatus for producing plastic objects with hollow spaces is disclosed. The method comprises the following steps: injecting a sufficient amount of plastic melt into the cavity (2) of the molding tool (1); simultaneously and/or subsequently injecting a pressurized fluid into the melt by means of a fluid injection nozzle (7); allowing the molded part (6) to cool; relieving the cavity (2) of the pressure of the compressed fluid, and demolding the molded part, while plastic melt is driven out into at least one overflow cavity (8), which is connected to the cavity (2). According to the invention, the volume of the overflow cavity (8) is changed, and in particular enlarged. This volume increase advantageously is controlled or regulated. The advantage achieved thereby is that the injection molding cycle, especially the overflow of melt into the overflow cavity (8), remains controllable by simple means.

6 Claims, 2 Drawing Sheets

METHOD FOR PRODUCING PLASTIC OBJECTS

BACKGROUND OF THE INVENTION

German patent document DE 39 13 109 C2 discloses a way of producing hollow plastic objects in which the mold cavity is first completely filled with plastic melt. After the melt begins to solidify at the walls of the mold cavity, the still liquid core of the plastic object is driven out by a pressurized fluid into a demoldable secondary cavity. This secondary cavity is disposed outside the main mold cavity but is connected with it. In this way, it is possible to produce plastic bodies, even with complicated geometrical shapes, that have perfect surface characteristics, and especially without spider lines. Even in the case of a few, relatively narrow hollow spaces in an essentially solid plastic object, there are no sink marks on the surface.

European patent document EP 0 321 117 B1 teaches an internal gas pressure method by which, in similar fashion, the cavity of a tool is first filled with melt. The melt also allowed to flow into an overflow cavity that is in fluid communication to the main cavity of the tool. Pressurized gas is then conducted from the overflow into the interior of the still liquid plastic mass. This forms a hollow space in the molded part, which both saves weight and saves material.

Furthermore, a method known from the European patent document EP 0 438 279 A1 teaches to perform the injection molding process under a high pressure, which is typical for injection molding and not under the comparatively low gas pressure, which normally exists with the internal gas pressure method. Consequently, the end of the cavity has a lock, which is initially closed. In this operating mode, the melt is injected into the cavity at high pressure, until the cavity is completely filled. After the melt begins to solidify, the lock is opened, providing a path to an overflow cavity. The liquid core of the molded part is then driven into this overflow by compressed gas.

SUMMARY OF THE INVENTION

A number of disadvantages have been observed with the above-described known methods. Since the fluid connection between the main and secondary cavity described in patent document EP 0 321 117 B1 is always open, the overflow of melt from the cavity into the overflow cavity cannot be directly controlled. As a result, the entire injection molding process is difficult to monitor and control. Furthermore, one result of the procedure just described is that the compressed gas, which flows from the overflow cavity into the cavity, leaves behind a flow channel. This negatively affects the surface characteristics of the finished molded part.

In the techniques described in patent documents DE 39 13 109 C2 and EP 0 438 279 A1, the flow of melt from the cavity into the overflow cavity can be influenced. EP 0 438 279 A1, however, only provides that the connection from the main cavity to the secondary cavity is opened at a particular time, which determines the time when the melt will flow over. And after this time, there no longer is any control of the flow of melt. On the other hand, with DE 39 13 109 C2, there are slide elements in the connection channel between the main and secondary cavity, which may be used to regulate the flow of melt. The disadvantage here, however, is that a relatively complicated apparatus is necessary to implement the described method. Because of this structure, operation of the flow control elements between the main and overflow cavity is unreliable. The connection channel between the cavity and the overflow may "freeze" or become plugged with solidified or partially solidified melt.

The present invention concerns a method and an associated apparatus by which it is possible to eliminate the above disadvantages associated with the control or regulation of the flow of melt from the main cavity to the overflow without requiring a complicated apparatus with a locking device or the like, which can become jammed. Further, the volume of the overflow cavity is changed, and in particular enlarged, in dependence on the time after the cavity begins to fill with plastic melt and/or in dependence on the pressure in the cavity. The present invention starts from the basic idea that an overflow cavity, which is in fluid communication with to the main cavity, always tries to fill completely with melt, given an appropriate pressure in the main cavity. The volume of the overflow cavity, which is always available as a result of the control or regulation, allows the exact outflow of melt from the main cavity to the overflow cavity without the need for complicated actuator elements. Valve devices between the main and secondary cavity, which require complex apparatus, are thus obviated; the flow of melt into the overflow cavity can be controlled by simple means.

In specific embodiments, the connecting area between the cavity and the overflow cavity can be heated in order to maintain a consistent fluid connection between the main cavity and the overflow cavity.

To prevent a gas flow path and a consequent opening in the finished molded part as a result of gas flowing out of the main cavity into the secondary cavity, the invention further provides that, before the molded part completely cools and solidifies, the volume of the overflow cavity is reduced in order to drive plastic melt back from the overflow cavity into the cavity. This closes any opening that may have been caused by the exiting of pressurized fluid from the cavity into the overflow cavity.

According to another aspect, the invention also features an apparatus including a molding tool, having at least two halves with a main cavity, a plasticizing unit and a plastic injection nozzle, and at least one fluid injection nozzle, and at least one overflow cavity is provided that is in fluid communication to the main cavity.

According to the invention, devices for changing the volume of the overflow cavity are provided, such that preferably the overflow cavity and the devices for changing the volume of the overflow cavity form a piston-cylinder system.

To influence the injection molding cycle exactly as regards the overflow of melt into the overflow cavity, the invention provides that control or regulation means influence the change of the volume of the overflow cavity.

Finally, the invention provides for a heater that heats the connecting area between the cavity and the overflow cavity. The heater ensures that a constant fluid connection between the main cavity and the overflow cavity is maintained or assured.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The drawing is not necessarily to scale; emphasis has instead been placed upon illustrating the principles of the invention. Of the drawings.

DETAILED DESCRIPTION OF THE PREFERRED EMBODIMENTS

Figure 1:
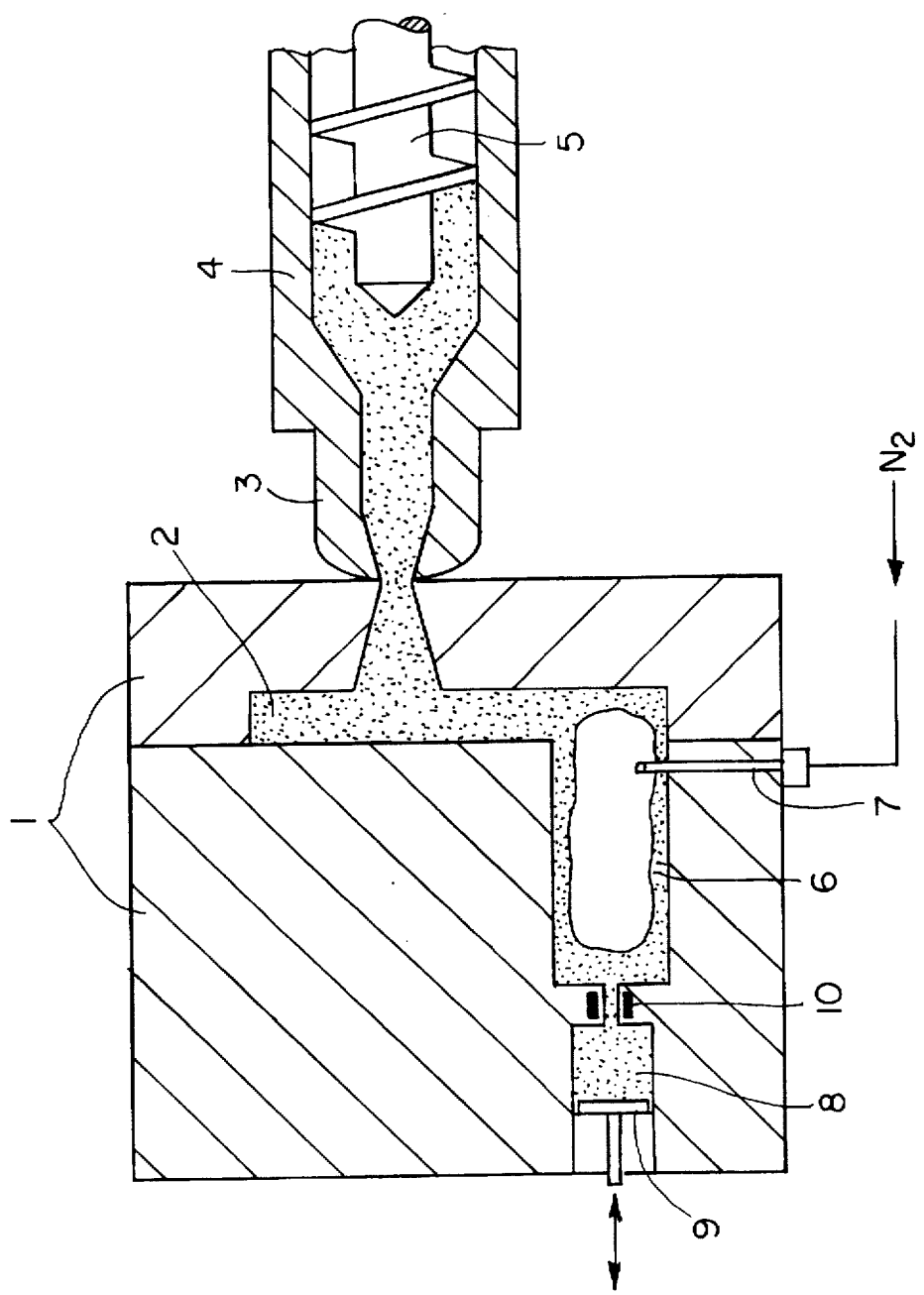
FIG. 1 schematically shows the inventive injection molding apparatus for producing hollow plastic objects.

A two-part molding tool 1 comprises a main cavity 2, or a hollow space, which defines the outer surface of the molded part 6 that is to be produced. A plasticizing unit 4, 5 is connected to the tool and includes a screw cylinder 4 and a screw 5, which can move therein rotationally and axially. The molding tool 1 and the plasticizing unit 4, 5 are connected by a plastic injection nozzle 3.

A fluid injection nozzle 7 is disposed in such a way that it can be inserted into the cavity 2, and it is shown in its inserted position. By means of this, pressurized fluid, specifically compressed nitrogen, can be put into the cavity from a source or supply unit, not shown. The pressurized gas distributes the melt in the cavity 2 and presses it against the walls of the tool 1.

The fluid injection nozzle 7 can be attached at an arbitrary position in the tool; for example, it can also be disposed concentric with the plastic injection nozzle 3, such that the melt and the fluid are injected through the same tool opening. In place of fluid injection nozzles extending directly into the cavity, other known gasification elements can also be provided alternatively or additionally. For instance, fluid nozzles can be integrated into the plastic injection nozzle 3 or into the sprue. It can also be appropriate to use several fluid injection nozzles 7.

An overflow cavity 8 is connected to the main cavity 2. The former can receive plastic melt and, where appropriate, also pressurized fluid. It therefore has a fluidic connection to the cavity 2. The connecting channel between the cavity 2 and the overflow cavity 8 has a heater 10. This prevents the melt from cooling in this connecting channel to the extent that it "freezes", and forms a plug in the channel. The heater 10 therefore assures a steady fluidic coupling between the main and secondary cavity. The connecting channel can also be designed to be very short, so that it is practically non-existent; the cavity 2 and overflow cavity 8 are then directly connected. The invention can also provide that the area of the overflow cavity 8 has heaters, not shown. This is especially appropriate if, at the end of the cycle, melt is to be pressed back from the overflow cavity 8 into the main cavity 2, as described below; the melt in the overflow cavity 8 then must not freeze prematurely.

The overflow cavity 8 is bounded by a piston 9, the position of which defines the effective volume of the overflow cavity 8. In the figure, this is shown by a double arrow, which indicates that the piston can move in the direction of the arrow. The overflow cavity 8 itself functions as cylinder in this design.

Figure 2:
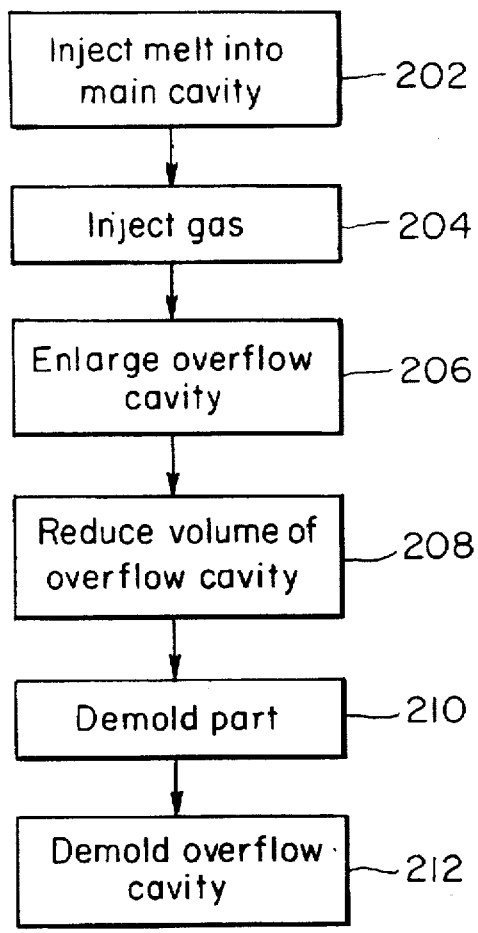
FIG. 2 is a process diagram showing the procedure for producing a molded part according to the present invention.

FIG. 2 shows the procedure for producing a molded part according to the invention.

First, plastic melt, in an amount sufficient to produce the molded part 6, is injected from the plasticizing unit into the main cavity 2 in step 202. It fills the cavity 2, at least partially, while the piston 9 is preferably at its right stop, so that the volume of the overflow cavity is at its minimum. In this way, practically no melt can flow out into the overflow cavity 8.

Compressed gas is then injected into the melt in the main cavity by means of the fluid injection nozzle 7 in step 204.

This is done for the reasons usually associated with the internal gas pressure method. The molded part becomes hollow and thus lighter, with the concomitant savings in plastic material. Another result of this procedure is that the gas presses the melt against the cavity wall and thus compensates the tendency of the solidifying plastic to shrink during cooling, consequently achieving a good surface characteristics without sink marks.

One possible implementation of the present invention is that, upon injecting the pressurized gas and creating the hollow space in the interior of the molded part 6, the piston 9 is gradually moved toward the left, under the action of a controller, not shown, as a result of which the volume of the overflow cavity 8 increases, in step 206. Apart from the volume contraction caused by shrinkage of the material during cooling, the volume corresponding to the hollow space in the interior of the molded part is then driven out into the overflow cavity 8, which provides just this volume by the corresponding piston position.

A number of modifications are possible to the process in other implementations. Pressurized gas may be injected simultaneously with the injection of the melt into the cavity 2; in this case, the cavity is not completely filled with melt. On the other hand, gas can be injected only when the melt has begun to exit into the overflow, after the cavity has been completely filled with melt.

Decisive and essential to the invention in every case is that the volume of the overflow cavity 8 is varied by moving the piston 9. This does not necessarily need to occur actively, that is by an appropriate control regulation in conjunction with an actuator mechanism. The procedure can also be such that the piston remains in its rightmost position (minimum volume of the overflow cavity 8), pre-tensioned, e.g., by spring elements, the pretension here being chosen so that the volume of the overflow cavity 8 will increase when certain pressure conditions prevail in the cavity 2, which cause the piston to move to the left.

If the volume change of the overflow cavity is actively controlled or regulated, this change can be made dependent on the time after a cavity begins to be filled with plastic melt or on the pressure in the cavity 2.

The usual drive elements (e.g. mechanical, hydraulic, electric, or pneumatic) can also be considered for moving the piston 9.

If not only melt but also pressurized gas should have exited into the overflow cavity 8, the gas generally will leave behind a channel after the molded part has hardened, and such a channel is troublesome at the surface of the finished molded part. The invention provides that this channel is again closed before hardening. For this purpose, the piston 9 is moved back somewhat (toward the right), as a result of which melt is moved from the overflow cavity 8 back into the cavity 2 in step 208. This closes the aforesaid channel, resulting in a perfect surface on the finished molded part.

When the melt which forms the molded part 6 has cooled sufficiently, the molding tool 1 can be opened, and the molded part 6 is thus removed from the mold in step 210. Before opening the two halves of the tool, however, the fluid pressure in the molded part first must be dissipated. For this, the gas flow path is released, for example by means of suitable valves, which are not shown.

The overflow cavity 8 likewise must be demolded before the next injection molding cycle in step 212. Its solidified contents can be recycled.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A method for producing hollow plastic objects, the method comprising:

injecting plastic melt into a main cavity of a molding tool along a melt flow path, which extends from a plasticizing unit through a plastic injection nozzle into the molding tool;

simultaneously and/or subsequently injecting a pressurized fluid into the melt via at least one fluid injection nozzle, so that the melt introduced into the molding tool is distributed in the main cavity while forming a hollow space, and is pressed against walls of the main cavity of the molding tool;

while and/or after the pressurized fluid is injected, driving out a portion of the plastic melt into at least one overflow cavity, which is connected to the main cavity, while enabling enlargement of a volume of the overflow cavity;

reducing the volume of the overflow cavity in order to drive plastic melt back from the overflow cavity into the main cavity;

allowing the molded part to cool down to a temperature below the melting point of the plastic melt;

relieving the cavity of the pressure of the pressurized fluid; and demolding the molded part.

2. The method of claim 1, further comprising controlling or regulating the enlargement of the volume of the overflow cavity.

3. The method of claim 2, further comprising controlling or regulating the enlargement of the volume of the overflow cavity in dependence on the time after the cavity begins to fill with plastic melt and/or in dependence on the pressure in the cavity.

4. The method of claim 1, further comprising heating a connecting area between the main cavity and the overflow cavity in order to maintain a constant fluid connection between the main cavity and the overflow cavity.

5. The method of claim 1 wherein the step of driving out the plastic melt comprises driving out the plastic melt admixed with the pressurized fluid.

6. The method of claim 5, further comprising driving the plastic melt back from the overflow cavity into the main cavity to close any opening in the molded part arising from the exit of the pressurized fluid from the main cavity into the overflow cavity.

* * * * *